United States Patent
Karaki et al.

(10) Patent No.: US 11,206,686 B2
(45) Date of Patent: Dec. 21, 2021

(54) LISTEN BEFORE TALK FOR UPLINK TRANSMISSION

(71) Applicant: TELEFONAKTIEBOLAGET L M ERICSSON (PUBL), Stockholm (SE)

(72) Inventors: Reem Karaki, Aachen (DE); Jung-Fu Cheng, Fremont, CA (US); Sorour Falahati, Stockholm (SE); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 180 days.

(21) Appl. No.: 16/075,571

(22) PCT Filed: Feb. 3, 2017

(86) PCT No.: PCT/IB2017/050607
§ 371 (c)(1),
(2) Date: Aug. 3, 2018

(87) PCT Pub. No.: WO2017/134624
PCT Pub. Date: Aug. 10, 2017

(65) Prior Publication Data
US 2019/0053276 A1  Feb. 14, 2019

Related U.S. Application Data

(60) Provisional application No. 62/292,002, filed on Feb. 5, 2016.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/0446* (2013.01);
(Continued)

(58) Field of Classification Search
None
See application file for complete search history.

(56) References Cited

U.S. PATENT DOCUMENTS

2014/0342745 A1   11/2014 Bhushan et al.
2016/0242213 A1*  8/2016 Dabeer ............. H04W 74/0833
(Continued)

FOREIGN PATENT DOCUMENTS

CN          104486013 A      4/2015

OTHER PUBLICATIONS

Ericsson et al., "New Work Item on enhanced LAA for LTE", RP-152272, 3GPP TSG RAN Meeting #70, Dec. 7-10, 2015.
(Continued)

*Primary Examiner* — Phirin Sam
(74) *Attorney, Agent, or Firm* — Withrow & Terranova, PLLC

(57) ABSTRACT

A method of controlling a user equipment (UE) comprises determining an operating environment of the UE, and selectively instructing the UE to perform a first or second listen-before-talk (LBT) procedure or to use a first or second set of LBT parameters, according to the determined operating environment.

35 Claims, 17 Drawing Sheets

(51) Int. Cl.
*H04W 74/00* (2009.01)
*H04W 16/14* (2009.01)
*H04W 72/04* (2009.01)
*H04W 72/08* (2009.01)
*H04L 5/00* (2006.01)

(52) U.S. Cl.
CPC ....... *H04W 72/082* (2013.01); *H04W 74/006* (2013.01); *H04L 5/001* (2013.01)

(56) References Cited

U.S. PATENT DOCUMENTS

| | | | |
|---|---|---|---|
| 2016/0309512 A1* | 10/2016 | Li | H04W 74/0816 |
| 2016/0345206 A1* | 11/2016 | Yerramalli | H04W 72/042 |
| 2016/0366689 A1* | 12/2016 | Zhang | H04W 16/14 |
| 2017/0048860 A1* | 2/2017 | Damnjanovic | H04W 74/0808 |
| 2017/0202022 A1* | 7/2017 | Chendamarai Kannan | H04W 72/14 |
| 2017/0230944 A1* | 8/2017 | Babaei | H04W 72/14 |
| 2017/0230945 A1* | 8/2017 | Babaei | H04W 72/1289 |
| 2017/0231004 A1* | 8/2017 | Babaei | H04W 74/0808 |
| 2018/0116001 A1* | 4/2018 | Zhang | H04W 74/0808 |
| 2018/0255578 A1* | 9/2018 | Kim | H04W 72/1268 |
| 2018/0270860 A1* | 9/2018 | Bhorkar | H04W 74/0808 |
| 2018/0288805 A1* | 10/2018 | Bhorkar | H04W 74/0808 |
| 2019/0021105 A1* | 1/2019 | Hamidi-Sepehr | H04W 72/1268 |
| 2019/0123850 A1* | 4/2019 | Dinan | H04L 1/0023 |
| 2019/0342915 A1* | 11/2019 | Kim | H04W 72/0446 |
| 2020/0077374 A1* | 3/2020 | Dinan | H04L 5/0092 |
| 2020/0260452 A1* | 8/2020 | Dinan | H04W 72/0453 |

OTHER PUBLICATIONS

Ericsson, "On UL Channel Access Procedures for Enhanced LAA", R1-161001, 3GPP TSG RAN WG1 Meeting #84, Feb. 15-19, 2016.
Ericsson, "On UL Channel Access and PUSCH Design for Enhanced LAA", R1-160996, 3GPP TSG RAN WG1 Meeting #84, Feb. 15-19, 2016.
Wuawei et al. "Principles of UL channel access for LAA", 3GPP draft, R1-153783, vol. RAN WG1, Aug. 23, 2015.
Samsung, "Discussion on LBT for UL transmission", 3GPP Draft; R1-156768, vol. RAN WG1, Nov. 15, 2015.
Alcatel-Lucent Sshanghai Bell "UL LBT and DL/UL Frame Structure for LAA", vol. RAN WG1, Aug. 23, 2015.
Samsung, "Discussion on LBT for LAA UL", 3GPP Draft, R1-151049, vol. RAN WG1, Mar. 18, 2015.
Notification of Reason for Refusal for Korean Patent Application No. 10-2018-7025539, dated Sep. 27, 2019, 9 pages.
International Search Report and Written Opinion for International Patent Application No. PCT/IB2017/050607, dated Apr. 20, 2017, 11 pages.
Examination Report for European Patent Application No. EP17704828, dated Feb. 14, 2020, 7 pages.
Notification of Reason for Refusal for Korean Patent Application No. 10-2018-7025539, dated Mar. 9, 2020, 4 pages.
First Office Action for Chinese Patent Application No. 201780009293. 1, dated Jul. 5, 2021, 18 pages.
Examination Report for Vietnamese Patent Application No. 1-2018-03283, dated Jun. 30, 2021, 4 pages.

* cited by examiner

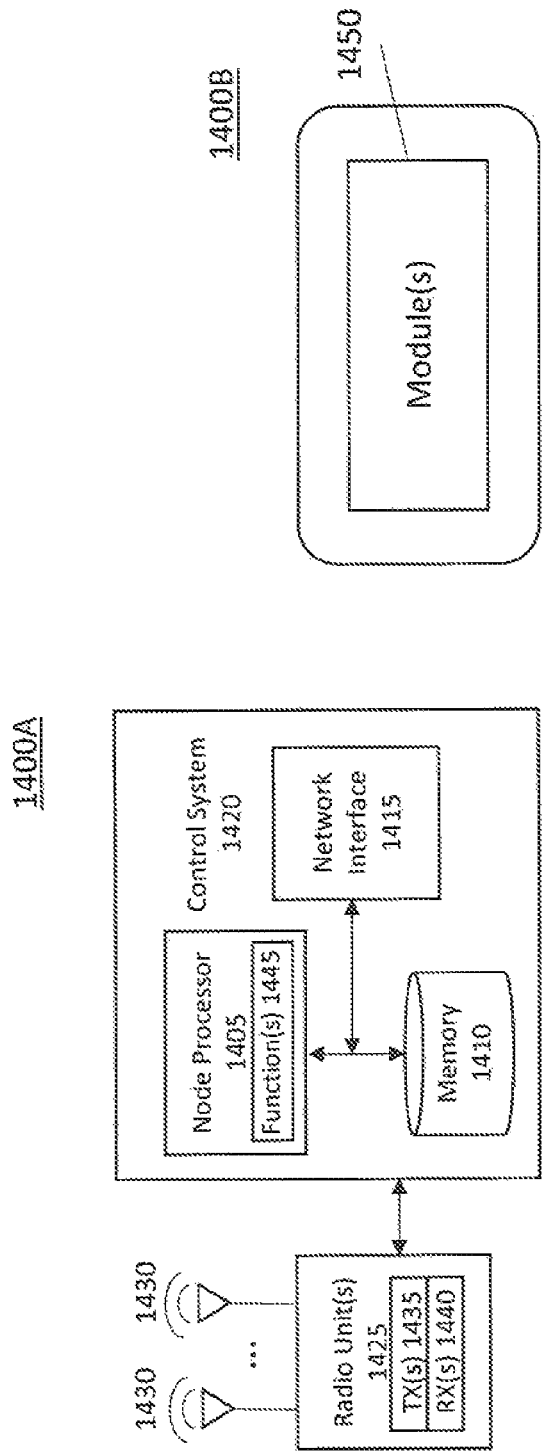

LISTEN BEFORE TALK FOR UPLINK TRANSMISSION

CROSS-REFERENCE TO RELATED APPLICATIONS

This application is a national stage application of International Patent Application No. PCT/IB2017/050607, filed Feb. 3, 2017, which claims priority to U.S. Provisional Patent Application No. 62/292,002 filed on Feb. 5, 2016, the disclosure of which are hereby incorporated by references in their entireties.

TECHNICAL FIELD

The disclosed subject matter relates generally to telecommunications. Certain embodiments of the disclosed subject matter relate more particularly to License Assisted Access (LAA), Listen Before Talk, and multi-carrier LAA.

BACKGROUND

The Third Generation Partnership Project (3GPP) initiative "License Assisted Access" (LAA) intends to allow Long Term Evolution (LTE) equipment to also operate in the unlicensed 5 GHz radio spectrum. In this context, the unlicensed 5 GHz spectrum is used as a complement to licensed radio spectrum. Accordingly, devices connect in licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements may prohibit transmissions in the unlicensed spectrum without prior channel sensing. Because the unlicensed spectrum must be shared with other radios of similar or dissimilar wireless technologies, a so called listen-before-talk (LBT) method is generally applied. Today, the unlicensed 5 GHz spectrum is mainly used by equipment implementing the IEEE 802.11 Wireless Local Area Network (WLAN) standard. This standard is known under its marketing brand "Wi-Fi."

Both Wi-Fi and LAA may operate in multi-carrier mode with simultaneous transmission across multiple unlicensed channels in the 5 GHz band. Wi-Fi follows a hierarchical multi-carrier LBT scheme known as channel bonding.

LTE uses OFDM in the downlink and DFT-spread OFDM (also referred to as single-carrier FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, the above described resource assignments can also be scheduled on the enhanced Physical Downlink Control Channel (EPDCCH). For Rel-8 to Rel-10 only Physical Downlink Control Channel (PDCCH) is available.

The reference symbols shown in FIG. 1 are the cell specific reference symbols (CRS) and are used to support multiple functions including fine time and frequency synchronization and channel estimation for certain transmission modes.

The PDCCH/EPDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. One way to obtain this would be through Carrier Aggregation (CA). CA implies that an LTE Rel-10 terminal can receive multiple CCs, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

A typical feature of carrier aggregation is the ability to perform cross-carrier scheduling. With cross-carrier scheduling, the PDSCH is received on a CC other than the one on which PDCCH/EPDCCH is received. Similarly, the PUSCH would be transmitted on an associated CC other than the one on which uplink grant is received. This mechanism allows a (E)PDCCH on one CC to schedule data transmissions on another CC using a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is basically deferred until the channel is deemed to be Idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism on a single unlicensed channel is shown in FIG. 5.

First consider the single-channel LBT case. After a Wi-Fi station "A" transmits a data frame to a station "B", station B shall transmit the ACK frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied.

Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

For multi-carrier operation, Wi-Fi follows a hierarchical channel bonding scheme to determine its transmission bandwidth for a frame, which could be 20 MHz, 40 MHz, 80 MHz, or 160 MHz for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the CW-based random access procedure after a defer period if necessary, and then counts down the random number generated. The secondary channels only perform a quick CCA check for a PIFS duration (generally 25 µs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions, i.e., transmission on secondary channels alone is not allowed.

For a device not utilizing the Wi-Fi protocol, European Regulation EN 301.893, v. 1.7.1 provides the following requirements and minimum behavior for the load-based clear channel assessment. An example to illustrate EN 301.893 is shown in FIG. 6.

1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

NOTE 2: The equipment is allowed to continue Short Control Signalling Transmissions on this channel providing it complies with the requirements in clause 4.9.2.3.

NOTE 3: For equipment having simultaneous transmissions on multiple (adjacent or non-adjacent) operating channels, the equipment is allowed to continue transmissions on other Operating Channels providing the CCA check did not detect any signals on those channels.

3) The total time that an equipment makes use of an Operating Channel is the Maximum Channel Occupancy Time which shall be less than (13/32)×q ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence 5) The energy detection threshold for the CCA shall be proportional to the maximum transmit power (PH) of the transmitter: for a 23 dBm Equivalent Isotropically Radiated Power (e.i.r.p.) transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

Up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum, as shown in FIG. 7, a UE is connected to a PCell in the licensed band and one or more SCells in the unlicensed band. In this description we denote a secondary cell in unlicensed spectrum as LAA secondary cell (LAA SCell). The LAA SCell may operate in DL-only mode or operate with both UL and DL traffic. Furthermore, in future scenarios the LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

To coexist fairly with the Wi-Fi system, transmission on the SCell shall conform to LBT protocols to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms according to EN 301.893. An example in the context of LAA is shown in FIG. 8. with different examples for the duration of a transmission burst on the LAA SCell constrained by a maximum allowed transmission duration of 4 ms. Before the eNB transmit data in the DL, it performs LBT to gain channel access. During the eNB's transmission duration, it also sends out control channels to schedule certain UEs to transmit in the UL at specific time later. After the eNB releases the channel, the scheduled UEs perform LBT to determine whether they can transmit in the channel at the specific time.

FIG. 8 illustrates LAA to unlicensed spectrum using LTE carrier aggregation and listen-before-talk to achieve a desired level of coexistence with other unlicensed band technologies.

The use of LTE carrier aggregation (CA), introduced in Rel-10, offers a way to increase the peak data rate, system capacity and user experience by aggregating radio resources from multiple carriers that may reside in the same band or different band.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. Enabling the utilization of multi-carrier operation on unlicensed carrier using LAA is deemed necessary as further CA enhancements. The extension of the CA framework beyond 5 carriers has been started in LTE Rel-13. The objective is to support up to 32 carriers in both UL and DL.

SUMMARY

In certain embodiments of the disclosed subject matter, a method of controlling a user equipment (UE) comprises determining an operating environment of the UE, and selectively instructing the UE to perform a first or second listen-before-talk (LBT) procedure or to use a first or second set of LBT parameters, according to the determined operating environment.

In certain related embodiments, instructing the UE comprises transmitting information on an uplink scheduling control channel, such as PDCCH.

In certain related embodiments, the operating environment is determined based on statistics of uplink transmissions for scheduled UEs.

In certain related embodiments, the operating environment is determined based on an operating environment indication provided from the UE based on the UE's own channel measurement. The operating environment indication may indicate e.g. whether the UE observes persistent short interference bursts rather than long interference bursts.

In certain related embodiments, determining the operating environment of the UE comprises determining whether the UE is expected to experience a similar or different interference environment compared to at least one other UE to be scheduled in different frequency sub-carriers on the same cell as the UE. The method may further comprise e.g. instructing the UE to perform the first LBT procedure or to use the first set of LBT parameters upon determining that the UE is expected to experience the similar interference environment, else instructing the UE to perform the second LBT procedure or to use the second set of LBT parameters upon determining that the UE is expected to experience the different interference environment. Alternatively, the method may further comprise determining that the UE is expected to experience the different interference environment upon determining that one or more scheduled UEs do not perform UL transmissions at a predetermined time. As yet another alternative, the method may further comprise maintaining a one-bit value indicating whether the UE and the at least one other UEs successfully completed a last scheduled UL transmission, and determining whether the UE is expected to operate in the similar or different interference environment based on the one-bit value. As yet another embodiment, the method may further comprise maintaining a percentage value indicating how often the UE or any of the at least one other UEs successfully completed a previous scheduled UL transmission, and determining whether the UE is expected to operate in the similar or different interference environment based the percentage value.

In certain related embodiments, the second LBT procedure or second set of LBT parameters differs from the first LBT procedure or first set of LBT parameters in that additional LBT opportunities are provided during a scheduled duration. The scheduled duration may comprise e.g. multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

In some embodiments of the disclosed subject matter, a method of operating a user equipment (UE) comprises receiving instructions to perform a first or second listen-before-talk (LBT) procedure or to use a first or second set of LBT parameters, according to a determined operating environment, and performing the first or second listen-before-talk (LBT) procedure or using the first or second set of LBT parameters, according to the received instructions.

In certain related embodiments, the instructions are transmitted on an uplink (UL) scheduling control channel.

In certain related embodiments, the operating environment is determined based on statistics of UL transmissions for scheduled UEs.

In certain related embodiments, the operating environment is determined based on an operating environment indication provided by the UE to a radio access node based on the UE's own channel measurement. The operating environment indication may indicate e.g. whether the UE observes persistent short interference bursts rather than long interference bursts.

In certain related embodiments, the operating environment of the UE is determined according to whether the UE is expected to experience a similar or different interference environment compared to at least one other UE to be scheduled in different frequency sub-carriers on the same cell as the UE. In such embodiments, the method may further comprise receiving an instruction to perform the first LBT procedure or to use the first set of LBT parameters when the UE is expected to experience the similar interference environment, else receiving an instruction to perform the second LBT procedure or to use the second set of LBT parameters when the UE is expected to experience the different interference environment.

In certain related embodiments, the second LBT procedure or second set of LBT parameters differs from the first LBT procedure or first set of LBT parameters in that additional LBT opportunities are provided during a scheduled duration. The scheduled duration may comprise multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

In some embodiments of the disclosed subject matter, a radio access node configured to control a user equipment (UE) comprises at least one memory, transceiver, and processor collectively configured to determine an operating environment of the UE, and selectively instruct the UE to perform a first or second listen-before-talk (LBT) procedure or to use a first or second set of LBT parameters, according to the determined operating environment.

In certain related embodiments, instructing the UE comprises transmitting information on an uplink scheduling control channel.

In certain related embodiments, the operating environment is determined based on statistics of uplink transmissions for scheduled UEs.

In certain related embodiments, the operating environment is determined based on an operating environment indication provided from the UE based on the UE's own channel measurement.

In certain related embodiments, the operating environment indication indicates whether the UE observes persistent short interference bursts rather than long interference bursts.

In certain related embodiments, determining the operating environment of the UE comprises determining whether the UE is expected to experience a similar or different interference environment compared to at least one other UE to be scheduled in different frequency sub-carriers on the same cell as the UE. The at least one memory, transceiver and processor may be further collectively configured to instruct the UE to perform the first LBT procedure or to use the first set of LBT parameters upon determining that the UE is expected to experience the similar interference environment, else instructing the UE to perform the second LBT procedure or to use the second set of LBT parameters upon determining that the UE is expected to experience the different interference environment. Alternatively, the at least one memory, transceiver and processor are collectively further configured to determine that the UE is expected to experience the different interference environment upon determining that one or more scheduled UEs do not perform UL transmissions at a predetermined time. In another alternative, the at least one memory, transceiver and processor may be further collectively configured to maintain a one-bit value indicating whether the UE and the at least one other UEs successfully completed a last scheduled UL transmission, and determine whether the UE is expected to operate in the similar or different interference environment based on the one-bit value. In yet another alternative, the at least one memory, transceiver and processor are collectively further configured to maintain a percentage value indicating how often the UE or any of the at least one other UEs successfully completed a previous scheduled UL transmission, and determine whether the UE is expected to operate in the similar or different interference environment based the percentage value.

In certain related embodiments, the second LBT procedure or second set of LBT parameters differs from the first LBT procedure or first set of LBT parameters in that additional LBT opportunities are provided during a scheduled duration. The scheduled duration may comprise multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

In some embodiments of the disclosed subject matter, a user equipment (UE) comprises a memory, transceiver, and at least one processor collectively configured to:

receive instructions to perform a first or second listen-before-talk (LBT) procedure or to use a first or second set of LBT parameters, according to a determined operating environment, and perform the first or second listen-before-talk (LBT) procedure or use the first or second set of LBT parameters, according to the received instructions.

In certain related embodiments, the instructions are transmitted on an uplink (UL) scheduling control channel.

In certain related embodiments, the operating environment is determined based on statistics of UL transmissions for scheduled UEs.

In certain related embodiments, the operating environment is determined based on an operating environment indication provided by the UE to a radio access node based on the UE's own channel measurement. The operating environment indication may indicate whether the UE observes persistent short interference bursts rather than long interference bursts.

The operating environment of the UE may be determined according to whether the UE is expected to experience a similar or different interference environment compared to at least one other UE to be scheduled in different frequency sub-carriers on the same cell as the UE. The method may further comprise receiving an instruction to perform the first LBT procedure or to use the first set of LBT parameters when the UE is expected to experience the similar interference environment, else receiving an instruction to perform the second LBT procedure or to use the second set of LBT parameters when the UE is expected to experience the different interference environment.

In certain related embodiments, the second LBT procedure or second set of LBT parameters differs from the first LBT procedure or first set of LBT parameters in that additional LBT opportunities are provided during a scheduled duration. The scheduled duration comprises multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

In certain related embodiments, a method of operating a network node in a wireless communication system comprises determining a load of the wireless communication system, determining a listen before talk (LBT) procedure or LBT parameters for a plurality of user equipment (UE) devices based on the determined load, and instructing the UE devices to perform the determined LBT procedure or to use the determined LBT parameters.

In certain related embodiments, determining the LBT procedure or LBT parameters comprises scheduling the UE devices based on the determined load, determining whether any of the scheduled UE devices are concurrently scheduled in a subframe or in one or more consecutive subframes, and determining the LBT procedure or LBT parameters according to the determination of whether the scheduled UE devices are concurrently scheduled in the subframe or in one or more consecutive subframes.

BRIEF DESCRIPTION OF THE DRAWINGS

The drawings illustrate selected embodiments of the disclosed subject matter. In the drawings, like reference labels denote like features.

FIG. 14A illustrates a radio access node according to an embodiment of the disclosed subject matter.

FIG. 14B illustrates a radio access node according to another embodiment of the disclosed subject matter.

DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In current LTE, multiple UE can be scheduled to use different frequency sub-carriers on the same cell. For example, two UEs can be scheduled by an eNB to each use half of the sub-carriers. In such situations, system performance depends to some extent on whether the UEs experience the same or different interference environments, as illustrated by examples in FIGS. 9 and 10.

Figure 1:
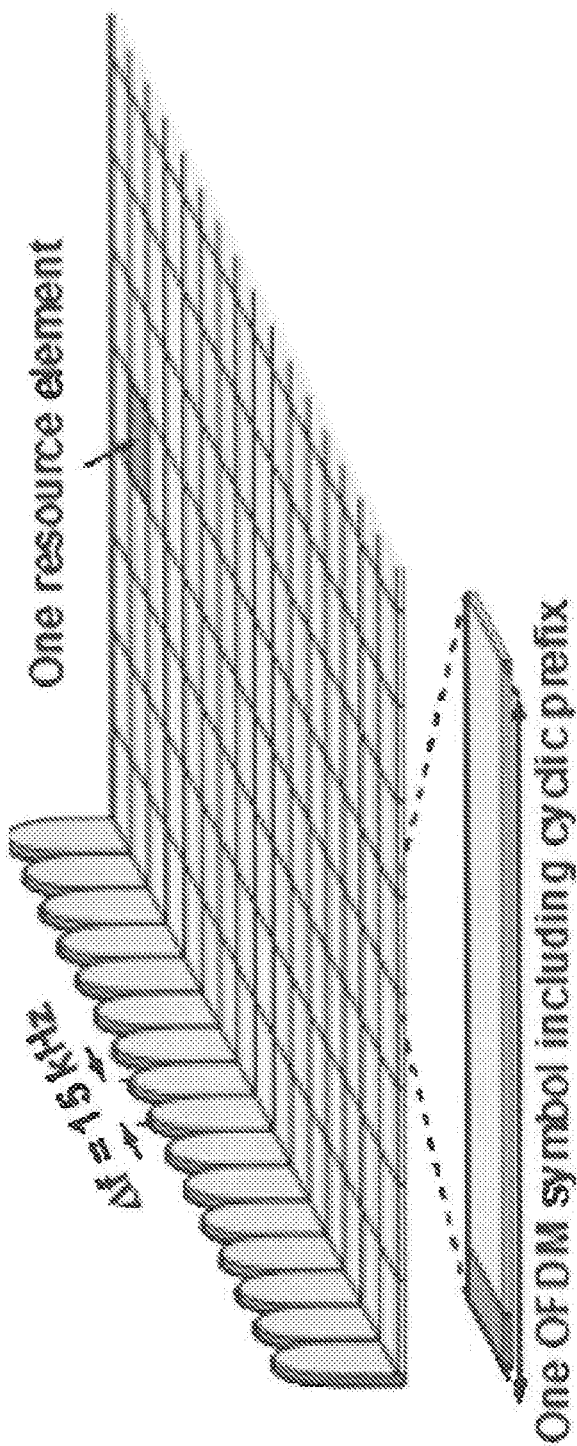
FIG. 1 illustrates a LTE downlink physical resource.
Figure 2:
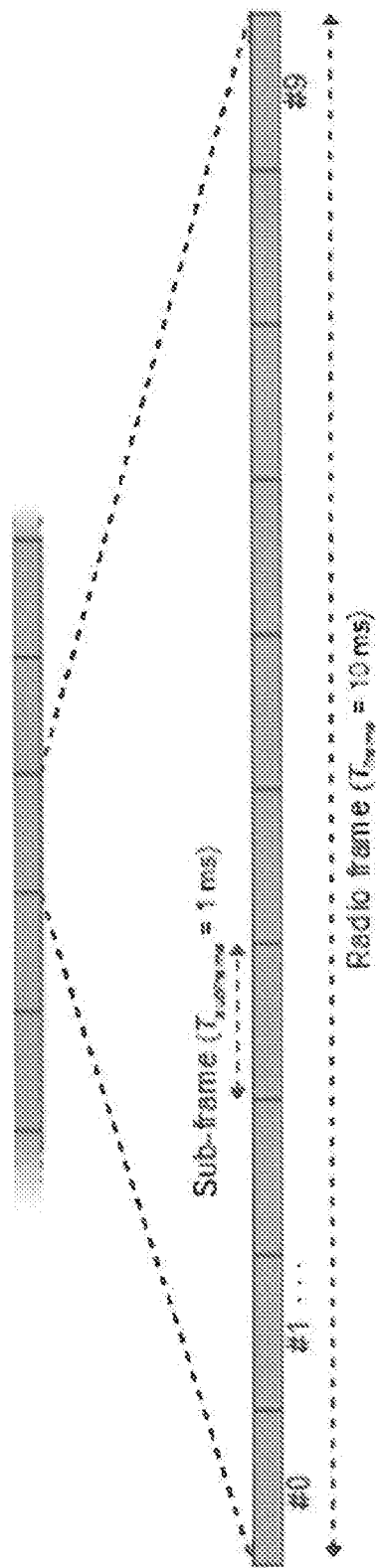
FIG. 2 illustrates an LTE time-domain structure.
Figure 3:
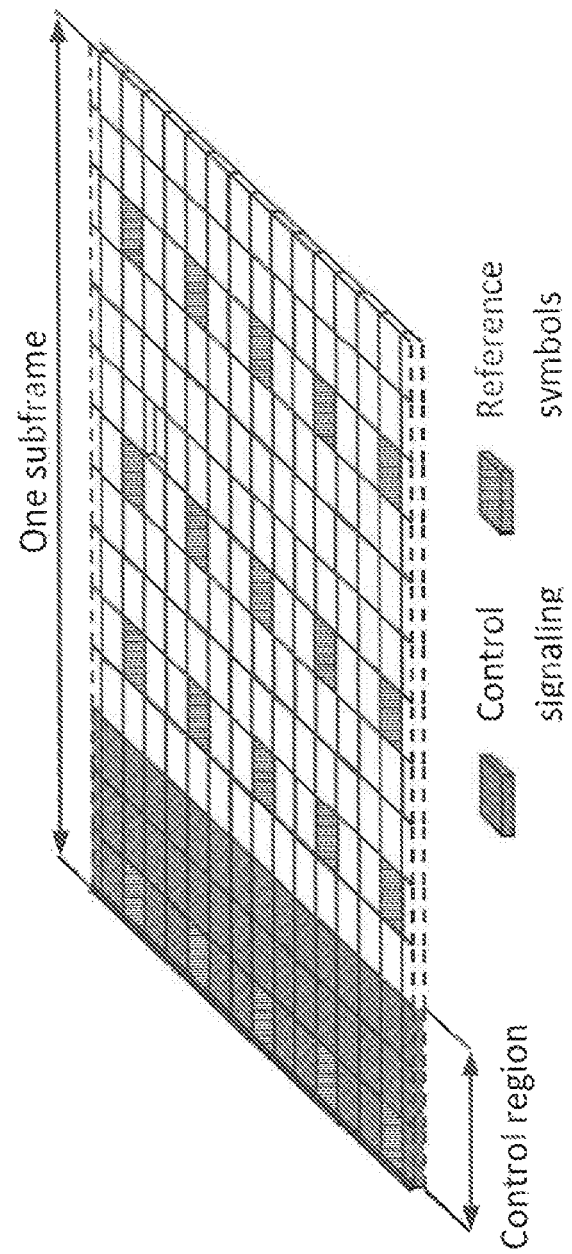
FIG. 3 illustrates a normal downlink subframe.
Figure 4:
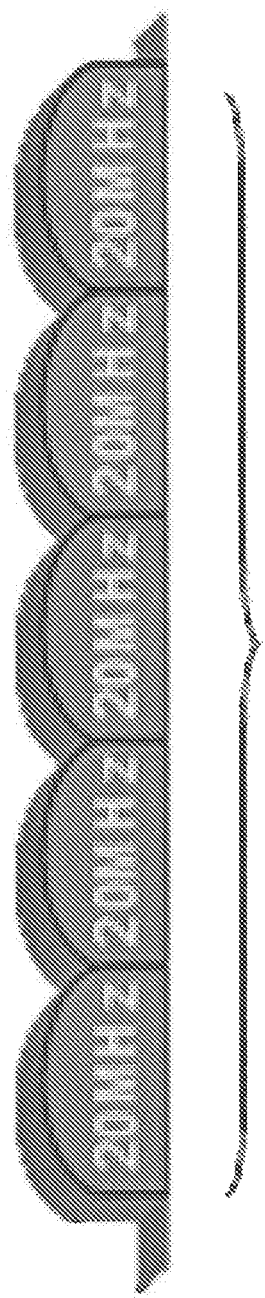
FIG. 4 illustrates carrier aggregation.
Figure 5:
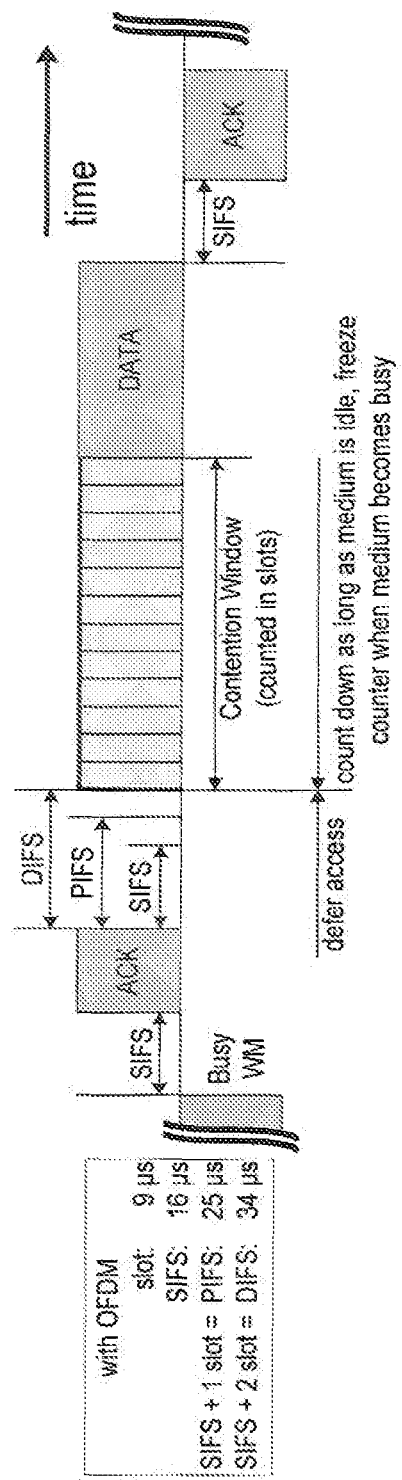
FIG. 5 illustrates listen before talk (LBT) in Wi-Fi.
Figure 6:
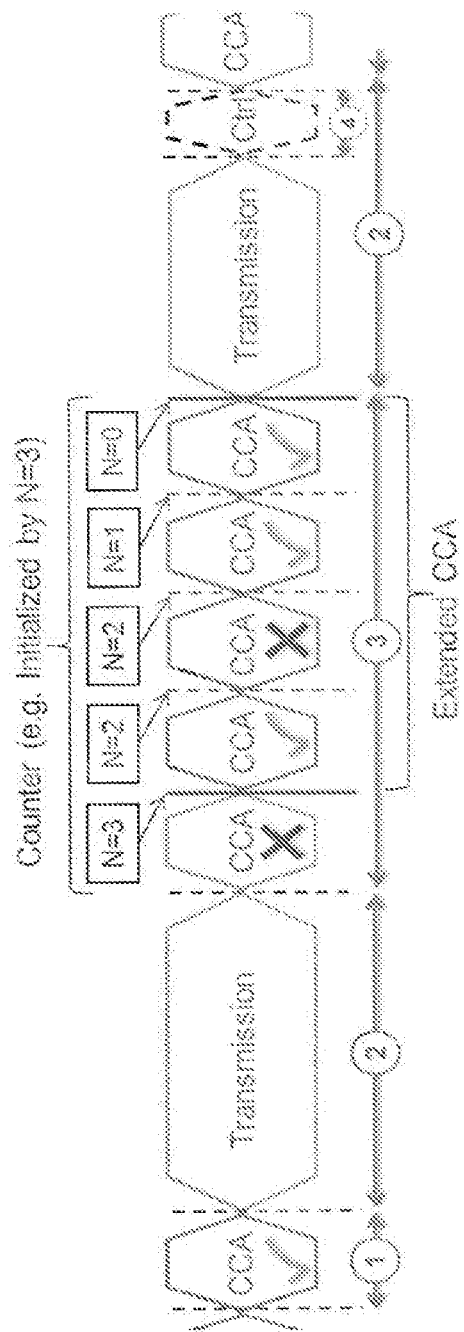
FIG. 6 illustrates listen before talk (LBT) in EN 301.893.
Figure 7:
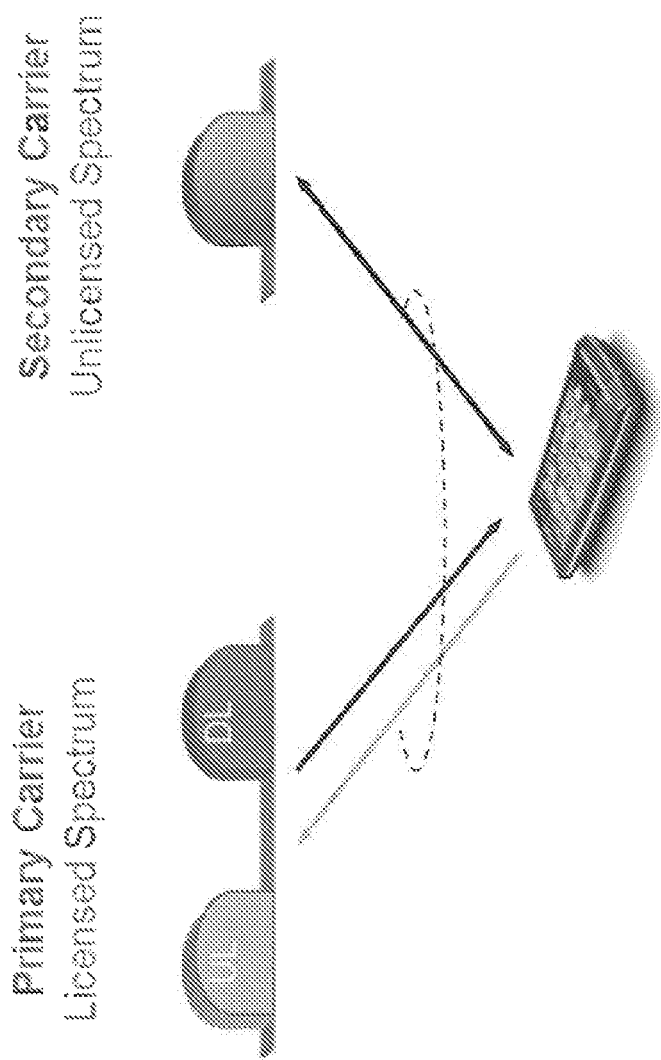
FIG. 7 illustrates CA-capable UE configured with one LAA SCell.
Figure 8:
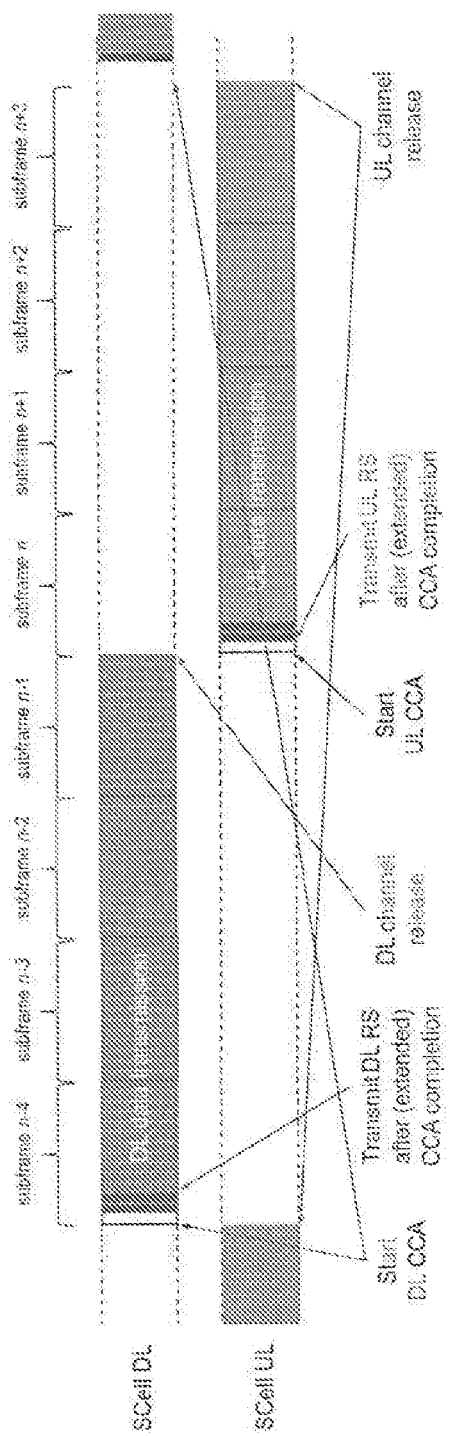
FIG. 8 illustrates LAA to unlicensed spectrum using LTE carrier aggregation and listen-before-talk to ensure a desired level of coexistence with other unlicensed band technologies.
Figure 9:
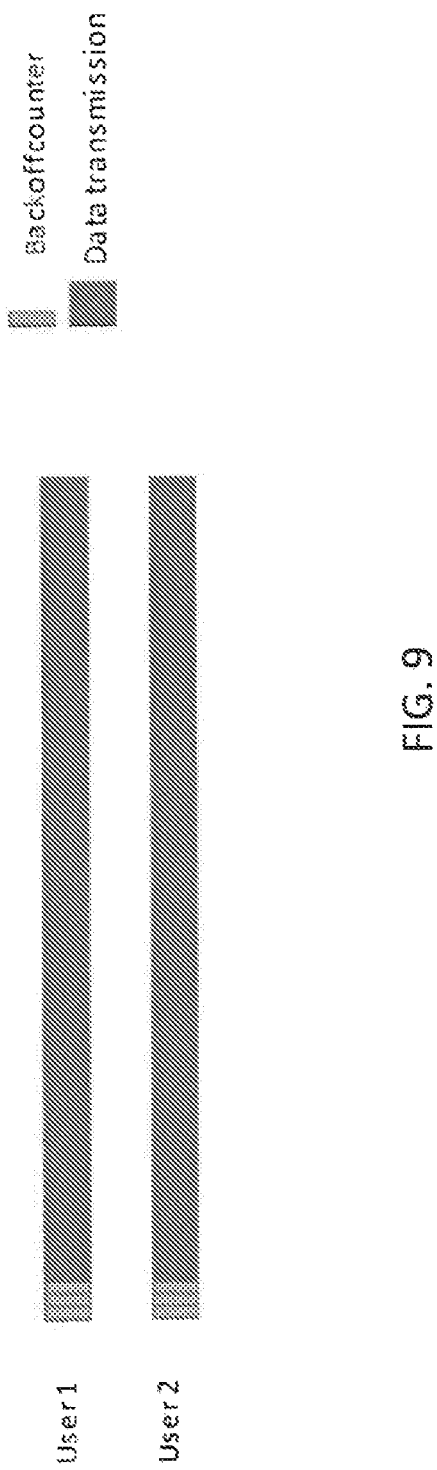
FIG. 9 illustrates UL user multiplexing in the LAA SCell when users experience identical or similar interference environment according to an embodiment of the disclosed subject matter.

FIG. 9 shows an example of UL user multiplexing in the LAA SCell when users experience identical or similar interference environment. If the two UEs experience identical or similar interference environment in the unlicensed band, as illustrated in FIG. 9, both of them will be able to finish LBT and start transmission as scheduled by the eNB.

Figure 10:
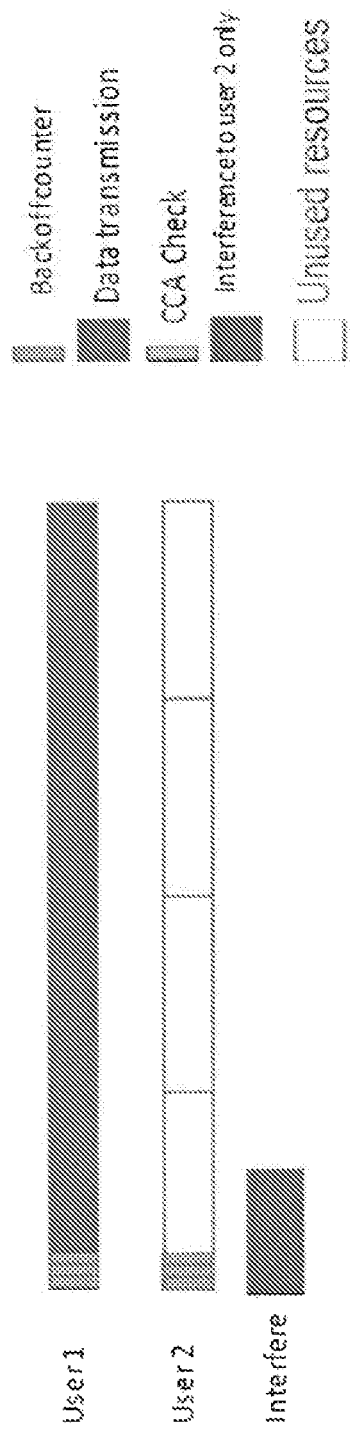
FIG. 10 illustrates UL user multiplexing in the LAA SCell when users experience different interference environment according to an embodiment of the disclosed subject matter.

FIG. 10 shows an example of UL user multiplexing in the LAA SCell when users experience different interference environment. If the two users experience different interference environment, as illustrated in FIG. 10, it may occur that one of the UE completes the LBT and starts transmission. The other UE cannot complete the LBT procedure in time to start transmission at the specific time and will not be able to transmit. Two drawbacks are observed in this solution.

First, the sub-carriers scheduled for the second UE becomes unused as illustrated in FIG. 10. Even though the UE is allowed to transmit according to the LBT protocol, it will only utilize the sub-carriers scheduled to it and cannot transmit on the unused sub-carriers. This unused resources cause the system performance and user throughputs to degrade.

Second, as further illustrated in FIG. 10, the sub-carriers scheduled to the second UE remain unused for the scheduled duration for the UE even if the interference ceases shortly. This is because the second UE will observe the channel is occupied because of the ongoing transmissions from the first UE.

The above drawbacks can also be observed when a UE is scheduled for multiple LAA SCells. When the UE observes different interference environments on the scheduled SCells, it may be able to transmit on only a subset of the scheduled SCells. The other SCells become unused during the scheduled duration for the UE.

In recognition of the above and other potential drawbacks of conventional approaches, in certain embodiments described below, an eNB adapts the LBT procedures of the scheduled UE to the operation environment. The adapted LBT procedures are provided (i.e. signaled) to the scheduled UEs via control channels. The UEs are instructed to perform a first LBT procedure or to use a first set of LBT parameters in a first operation environment. The UEs are instructed to perform a second LBT procedure or to use a second set of LBT parameters in a second operation environment. In general, the term "instruct" may refer to any communication mechanism intended to cause a device to perform a specified action. An instruction may, for instance, take the form of an express command to perform a particular command, or it may include transmission of information that causes a device to act in a particular way (e.g., an implicit instruction). As an example of an implicit instruction, a network node may signal LAA UL LBT parameters to a UE via a PDCCH DCI message. If the DCI message has a first format, for instance, the UE may perform the first LBT procedure based on the corresponding LAA UL LBT parameters, and if the DCI message has a second format, the UE may perform the second LBT procedure based on the corresponding LAA UL LBT parameters In certain other embodiments described below, the eNB determines the operation environment based on the statistics of UL transmissions for the scheduled UEs.

In certain other embodiments described below, the UE provides operation environment indication to the eNB based on its own channel measurement.

The described embodiments can be applied variously to both LAA LTE and standalone LTE operation for both FDD and TDD systems. Certain embodiments could also be applied, for instance, in systems that operate entirely in unlicensed spectrum, such as Multefire systems.

In some embodiments, an eNB instructs (e.g. signals) a selected LBT procedure or LBT parameter set to a scheduled UE in a UL scheduling control channel. The UL scheduling control channel may be e.g. PDCCH, and the instruction or signaling may include e.g. transmission of DCI. The eNB can instruct the scheduled UEs to perform a first LBT procedure or to use a first set of LBT parameters in a first operation environment. This first operation environment may correspond to cases where the scheduled UEs are expected to experience similar or identical interference environment. When the eNB observed that certain scheduled UEs do not perform UL transmissions at a designated time, it can determine that the UEs experienced different interference environment than the other UEs that complete UL transmission successfully. When the eNB scheduled the UEs again (possibly with other UEs), the eNB instruct the scheduled UEs to perform a second LBT procedure or to use a second set of LBT parameters.

The second LBT procedure or second set of LBT parameters is different than the first LBT procedure or first set of LBT parameters in that additional LBT opportunities are provided during the scheduled duration. These opportunities may include, e.g., a clear CCAs as described with reference to FIG. 11.

Figure 11:
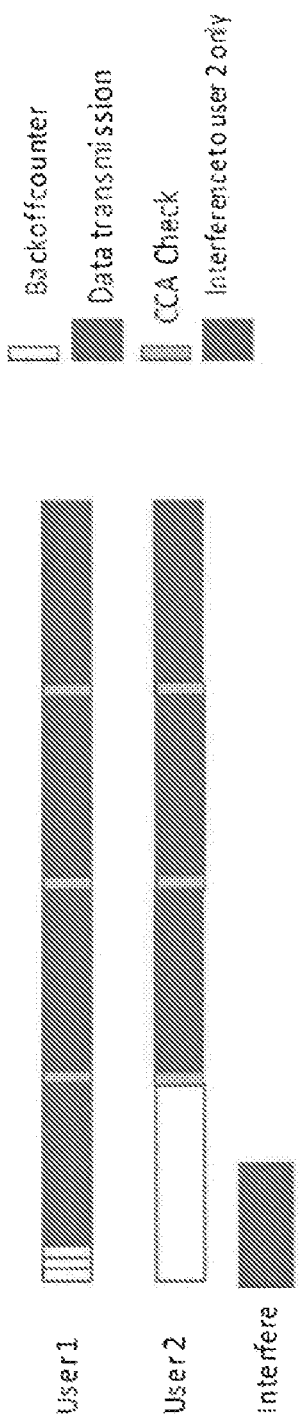
FIG. 11 illustrates UL user multiplexing in the LAA SCell when users experience different interference environment according to an embodiment of the disclosed subject matter.

FIG. 11 illustrates an example of the second LBT procedure or second set of LBT parameters, i.e. UL user multiplexing in the LAA SCell when users experience different interference environment. In this example, the UEs are instructed to perform a CCA check at the beginning of each subframe regardless of whether the UEs have obtained channel access or not. With this feature, the second UE can find the channel to be available during such CCA check opportunities when the interference ceases. As shown in the illustration, the second UE can thus start transmission and the system can avoid leaving the scheduled resources under-utilized.

In certain related embodiments, the eNB maintains UE-specific statistics on whether the UE successfully completes scheduled UL transmissions.

In one example, the eNB maintains one-bit value on whether the UE successfully completes the last scheduled UL transmission. For a UE not completing the last scheduled UL transmission, the UE is expected to operate in a different interference environment.

In another example, the eNB maintains one percentage value on how often the UE successfully completes the previous scheduled UL transmissions. For a UE with high percentage of not completing previous scheduled UL transmissions, the UE is expected to operate in a different interference environment.

The eNB determines the LBT procedure or LBT parameter set for the scheduled UEs based on whether some or all of the scheduled UEs are expected to operate in a different interference environment.

The UEs are frequently observing and measuring the channel to see whether there are data or control channels transmitted from the eNB to the UE. The UE hence has the opportunity to observe the interference patterns in the channel. The UE can signal to the eNB the operating environment type or characteristic. Such information can be provided by the UE to the eNB via UL physically layer control channel or higher layer control messages in a UL data channel One non-limiting example of such signaling is to indicate whether the UE observes persistent short interference bursts rather than long interference bursts.

In certain embodiments, the eNB determines the LBT procedure or LBT parameters for the scheduled UEs based on the load in the system. In a non-liming example based on the load in the system the eNB schedules the UEs. Based on the scheduling information, the eNB can determine if there are concurrent scheduled UEs in a subframe or in one or more consecutive subframes. Depending on the distribution of the scheduled UEs in upcoming subframes, the eNB can determine the LBT procedure or LBT parameter set for the scheduled UEs. One non-limiting example is that some group of scheduled UEs use a set of LBT parameters, such as to perform a CCA check at the beginning of each subframe regardless of whether the UEs have obtained channel access or not. With this feature, the second UE can find the channel to be available during such CCA check opportunities when the interference ceases. Another non-limiting example is that LBT parameters include set of subframe indices that the UE has to perform LBT. This means that if UE has access the channel before the indexed subframe, the UE has to release the channel and attempt LBT again for that subframe. The set of subframes can be same for all the UEs or different for groups of UEs or individual UEs.

In another variation of this embodiment, the eNB may instruct the UEs to not perform any LBT, but simply pause for a certain period, e.g., 25 or 16 microseconds before resuming transmission in a subsequent scheduled subframe. That is, one of the LBT instructions is to simply pause without doing any further LBT. This allows UEs that are commencing transmission in that subsequent subframe to obtain access to the channel while UEs that have already started transmission in the previous subframe and have a valid UL grant for transmission in the subsequent subframe do not have to switch their receiver hardware from Tx to Rx and back to Tx in a very short period of time.

In another variation of this embodiment, the eNB may instruct the UE to restart a random backoff procedure for every attempted LBT procedure prior to a scheduled subframe when transmission has not yet started rather than continue the random backoff procedure from a previous LBT procedure executed before a previous subframe that was not successfully accessed. In this case, the eNB may provide the UE with a fresh random backoff counter for each scheduled subframe. The UE restarts the random backoff procedure prior to an attempted transmission in every scheduled subframe. However, once it has successfully started transmissions in a scheduled subframe, it does not perform any more random backoff procedures before transmission in subsequently scheduled subframes.

The described embodiments may be implemented in any appropriate type of communication system supporting any suitable communication standards and using any suitable components. As one example, certain embodiments may be implemented in a communication system such as that illustrated in FIG. 12. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 12:
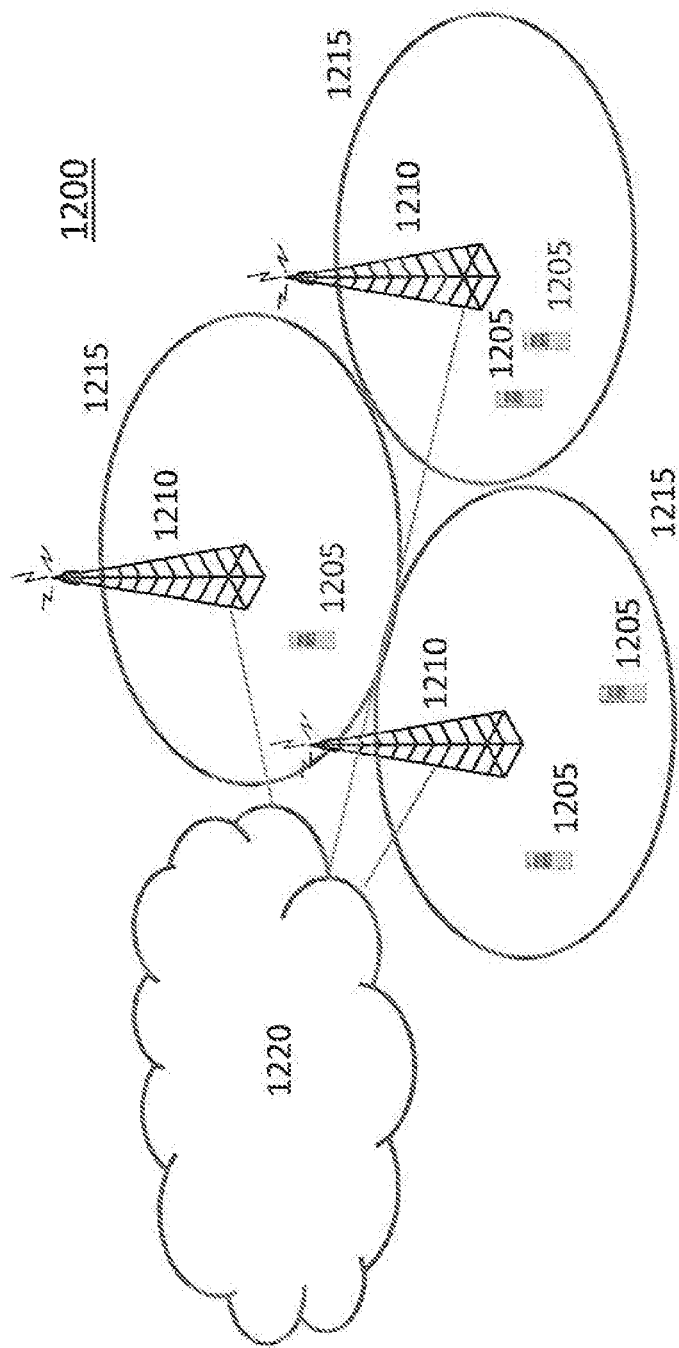
FIG. 12 illustrates communication system according to an embodiment of the disclosed subject matter.

Referring to FIG. 12, a communication system 1200 comprises a plurality of wireless communication devices 1205 (e.g., UEs, machine type communication [MTC]/machine-to-machine [M2M] UEs) and a plurality of radio access nodes 1210 (e.g., eNodeBs or other base stations). Communication system 1200 is organized into cells 1215, which are connected to a core network 1220 via corresponding radio access nodes 1210. Radio access nodes 1210 are capable of communicating with wireless communication devices 1205 along with any additional elements suitable to support communication between wireless communication devices or between a wireless communication device and another communication device (such as a landline telephone).

Figure 13A:
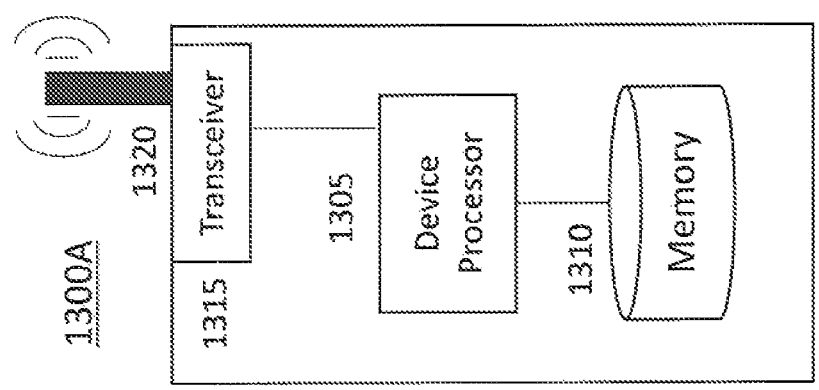
FIG. 13A illustrates a wireless communication device according to an embodiment of the disclosed subject matter.
Figure 13B:
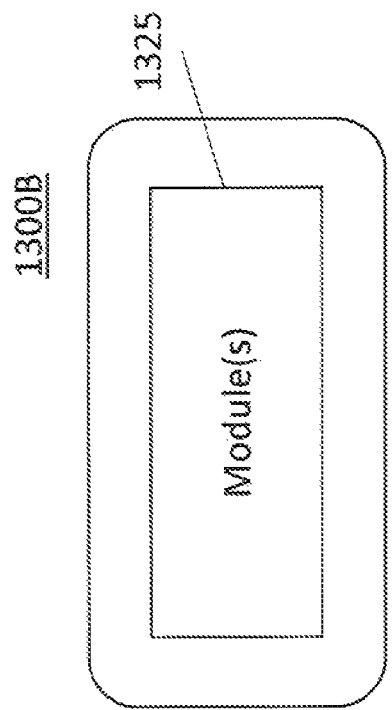
FIG. 13B illustrates a wireless communication device according to another embodiment of the disclosed subject matter.

Although wireless communication devices 1205 may represent communication devices that include any suitable combination of hardware and/or software, these wireless communication devices may, in certain embodiments, represent devices such as those illustrated in greater detail by FIGS. 13A and 13B. Similarly, although the illustrated radio access node may represent network nodes that include any suitable combination of hardware and/or software, these nodes may, in particular embodiments, represent devices such those illustrated in greater detail by FIGS. 14A, 14B and 15.

Referring to FIG. 13A, a wireless communication device 1300A comprises a processor 1305 (e.g., Central Processing Units [CPUs], Application Specific Integrated Circuits [ASICs], Field Programmable Gate Arrays [FPGAs], and/or the like), a memory 1310, a transceiver 1315, and an antenna 1320. In certain embodiments, some or all of the functionality described as being provided by UEs, MTC or M2M devices, and/or any other types of wireless communication devices may be provided by the device processor executing instructions stored on a computer-readable medium, such as memory 1310. Alternative embodiments may include additional components beyond those shown in FIG. 13A that may be responsible for providing certain aspects of the device's functionality, including any of the functionality described herein.

Referring to FIG. 13B, a wireless communication device 1300B comprises at least one module 1325 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 13A.

Referring to FIG. 14A, a radio access node 1400A comprises a control system 1420 that comprises a node processor 1405 (e.g., Central Processing Units (CPUs), Application Specific Integrated Circuits (ASICs), Field Programmable Gate Arrays (FPGAs), and/or the like), memory 1410, and a network interface 1415. In addition, radio access node 1400A comprises at least one radio unit 1425 comprising at least one transmitter 1435 and at least one receiver coupled to at least one antenna 1430. In some embodiments, radio unit 1425 is external to control system 1420 and connected to control system 1420 via, e.g., a wired connection (e.g., an optical cable). However, in some other embodiments, radio unit 1425 and potentially the antenna 1430 are integrated together with control system 1420. Node processor 1405 operates to provide at least one function 1445 of radio access node 1400A as described herein. In some embodiments, the function(s) are implemented in software that is stored, e.g., in the memory 1410 and executed by node processor 1405.

In certain embodiments, some or all of the functionality described as being provided by a base station, a node B, an enodeB, and/or any other type of network node may be provided by node processor 1405 executing instructions stored on a computer-readable medium, such as memory 1410 shown in FIG. 14A. Alternative embodiments of radio access node 1400 may comprise additional components to provide additional functionality, such as the functionality described herein and/or related supporting functionality.

Referring to FIG. 143B, a radio access node 1400B comprises at least one module 1450 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 14A.

Figure 15:
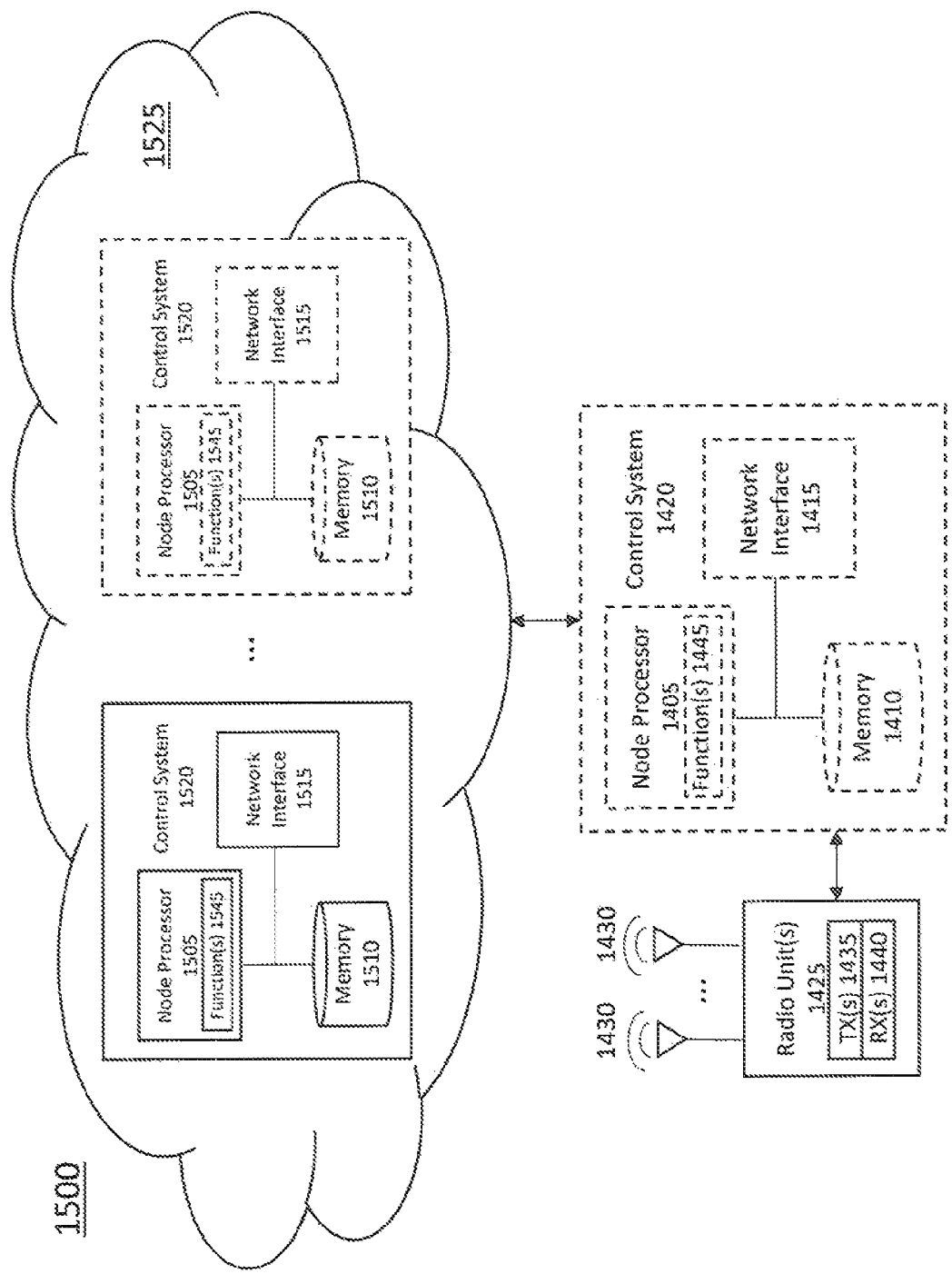
FIG. 15 illustrates a radio access node according to yet another embodiment of the disclosed subject matter.

FIG. 15 is a block diagram that illustrates a virtualized radio access node 1500 according to an embodiment of the disclosed subject matter. The concepts described in relation to FIG. 15 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 15, radio access node 1500 comprises control system 1420 as described in relation to FIG. 14A.

Control system 1420 is connected to one or more processing nodes 1520 coupled to or included as part of a network(s) 1525 via network interface 1515. Each processing node 1520 comprises one or more processors 405 (e.g., CPUs, ASICs, FPGAs, and/or the like), memory 1510, and a network interface 1515.

In this example, functions 1445 of radio access node 1400A described herein are implemented at the one or more processing nodes 1520 or distributed across control system 1420 and the one or more processing nodes 1520 in any desired manner. In some embodiments, some or all of the functions 1445 of radio access node 1400A described herein are implemented as virtual components executed by one or more virtual machines implemented in a virtual environment(s) hosted by processing node(s) 1520. As will be appreciated by one of ordinary skill in the art, additional signaling or communication between processing node(s) 1520 and control system 1420 is used in order to carry out at least some of the desired functions 1445. As indicated by dotted lines, in some embodiments control system 1420 may be omitted, in which case the radio unit(s) 1425 communicate directly with the processing node(s) 1520 via an appropriate network interface(s).

In some embodiments, a computer program comprises instructions which, when executed by at least one processor, causes at least one processor to carry out the functionality of a radio access node (e.g., radio access node 1210 or 1400A) or another node (e.g., processing node 1520) implementing one or more of the functions of the radio access node in a virtual environment according to any of the embodiments described herein.

Figure 16:
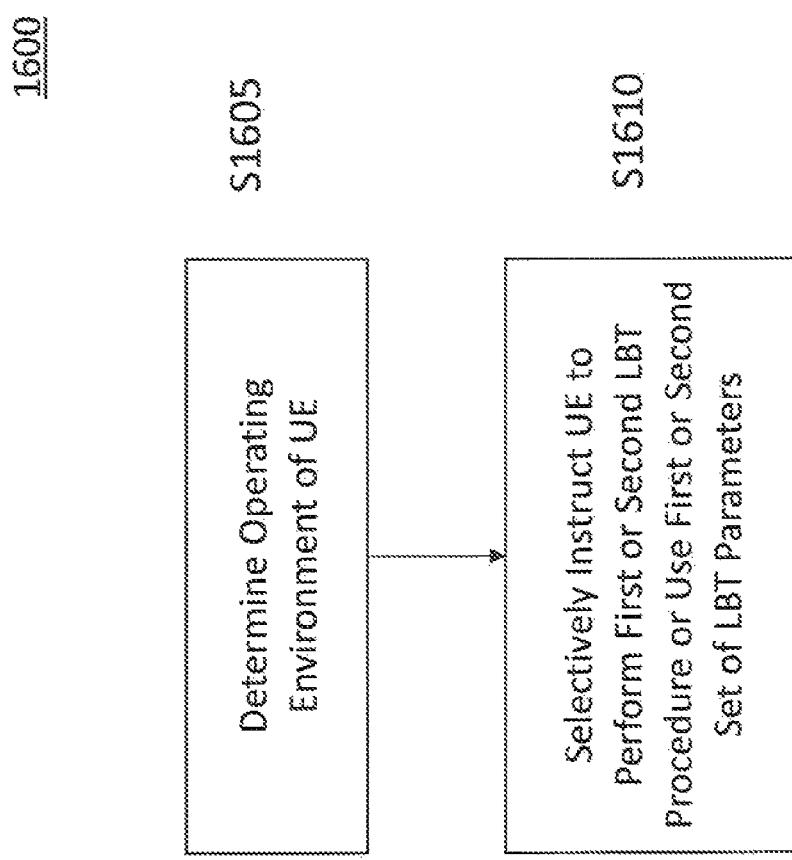
FIG. 16 illustrates a method of controlling a UE according to yet another embodiment of the disclosed subject matter.
Figure 17:
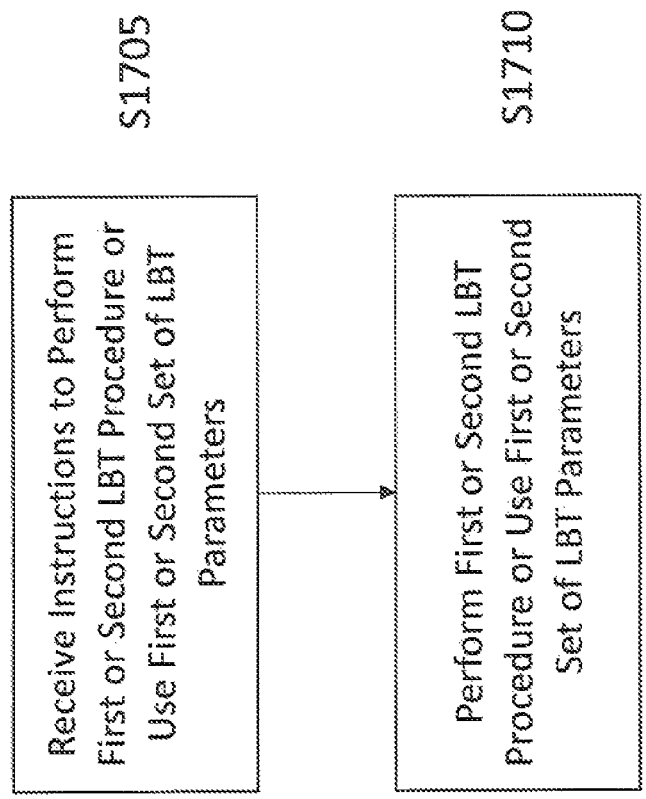
FIG. 17 illustrates a method of operating a UE according to yet another embodiment of the disclosed subject matter.

FIGS. 16 and 17 are flowcharts illustrating examples of methods that may be performed in various environments as described above. The various operations in these methods may be performed, e.g., by various combinations of at least one memory, processor and transceiver. They may also make use of various modules, software, etc., as described above.

Referring to FIG. 16, a method of controlling a UE comprises determining an operating environment of the UE (S1605), and selectively instructing the UE to perform a first or second listen-before-talk (LBT) procedure or to use a first or second set of LBT parameters, according to the determined operating environment (S1610). Instructing the UE may comprise e.g. transmitting information on an uplink scheduling control channel.

The operating environment may be determined based on statistics of uplink transmissions for scheduled UEs. The operating environment may also be determined based on an operating environment indication provided from the UE based on the UE's own channel measurement. The operating environment indication could indicate, for instance, whether the UE observes persistent short interference bursts rather than long interference bursts.

Determining the operating environment of the UE may comprise e.g. determining whether the UE is expected to experience a similar or different interference environment compared to at least one other UE to be scheduled in different frequency sub-carriers on the same cell as the UE. Moreover, the method may further comprise instructing the UE to perform the first LBT procedure or to use the first set of LBT parameters upon determining that the UE is expected to experience the similar interference environment, else instructing the UE to perform the second LBT procedure or to use the second set of LBT parameters upon determining that the UE is expected to experience the different interference environment. Alternatively, the method may further comprise determining that the UE is expected to experience the different interference environment upon determining that one or more scheduled UEs do not perform UL transmissions at a predetermined time. In yet another alternative, the method may further comprise maintaining a one-bit value indicating whether the UE and the at least one other UEs successfully completed a last scheduled UL transmission, and determining whether the UE is expected to operate in the similar or different interference environment based on the one-bit value. In still another alternative, the method may further comprise maintaining a percentage value indicating how often the UE or any of the at least one other UEs successfully completed a previous scheduled UL transmission, and determining whether the UE is expected to operate in the similar or different interference environment based the percentage value.

The second LBT procedure or second set of LBT parameters may differ from the first LBT procedure or first set of LBT parameters in that additional LBT opportunities are provided during a scheduled duration. The scheduled duration may comprise e.g. multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

Referring to FIG. 17, a method of operating a UE comprises receiving instructions to perform a first or second LBT procedure or to use a first or second set of LBT parameters, according to a determined operating environment (S1705), and performing the first or second LBT procedure or using the first or second set of LBT parameters, according to the received instructions (S1710). The instructions may be transmitted e.g. on a UL scheduling control channel.

The operating environment may be determined e.g. based on statistics of UL transmissions for scheduled UEs. Alternatively, the operating environment may be determined based on an operating environment indication provided by the UE to a radio access node based on the UE's own channel measurement. The operating environment indication may indicate e.g. whether the UE observes persistent short interference bursts rather than long interference bursts. In yet another alternative, the operating environment of the UE may be determined according to whether the UE is expected to experience a similar or different interference environment compared to at least one other UE to be scheduled in different frequency sub-carriers on the same cell as the UE.

The method may further comprise receiving an instruction to perform the first LBT procedure or to use the first set of LBT parameters when the UE is expected to experience the similar interference environment, else receiving an instruction to perform the second LBT procedure or to use the second set of LBT parameters when the UE is expected to experience the different interference environment.

The second LBT procedure or second set of LBT parameters may differ from the first LBT procedure or first set of LBT parameters in that additional LBT opportunities are provided during a scheduled duration. The scheduled duration may comprise e.g. multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

The following abbreviations, among others, may be used in this description.

CCA Clear Channel Assessment
CW Contention Window
DCF Distributed Coordination Function
DIFS DCF Inter-frame Spacing
DL Downlink
DRS Discovery Reference Signal
eNB evolved NodeB, base station
LAA Licensed Assisted Access
LBT Listen Before Talk
MRBC Multiple Random Backoff Channels
PDCCH Physical Downlink Control Channel
PIFS PCF Inter-frame Spacing
PUSCH Physical Uplink Shared Channel
QCI QoS Class Identifier
QoS Quality of Service
SCell Secondary Cell
SIFS Short Inter-frame Spacing
SRBC Single Random Backoff Channel
TTI Transmission-Time Interval
UE User Equipment
UL Uplink While the disclosed subject matter has been presented above with reference to various embodiments, it will be understood that various changes in form and details may be made to the described embodiments without departing from the overall scope of the disclosed subject matter.

The invention claimed is:

1. A method of controlling a user equipment (UE), comprising:
    selectively instructing the UE to perform a first or second listen-before-talk (LBT) procedure or to use a first or second set of LBT parameters, wherein the second LBT procedure or second set of LBT parameters differs from the first LBT procedure or first set of LBT parameters in that additional LBT opportunities are provided during a scheduled duration, and wherein the scheduled duration comprises multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

2. The method of claim 1, wherein instructing the UE comprises transmitting information on an uplink scheduling control channel.

3. The method of claim 1, further comprising determining an operating environment of the UE, and performing the selectively instructing according to the determined operating environment, wherein the operating environment is determined based on statistics of uplink transmissions for scheduled UEs.

4. The method of claim 1, further comprising determining an operating environment of the UE, and performing the selectively instructing according to the determined operating environment, wherein the operating environment is determined based on an operating environment indication provided from the UE based on the UE's own channel measurement.

5. The method of claim 4, further comprising determining an operating environment of the UE, and performing the selectively instructing according to the determined operating environment, wherein the operating environment indication indicates whether the UE observes persistent short interference bursts rather than long interference bursts.

6. The method of claim 1, further comprising determining an operating environment of the UE, and performing the selectively instructing according to the determined operating environment, wherein determining the operating environment of the UE comprises determining whether the UE is expected to experience a similar or different interference environment compared to at least one other UE to be scheduled in different frequency sub-carriers on the same cell as the UE.

7. The method of claim 6, further comprising instructing the UE to perform the first LBT procedure or to use the first set of LBT parameters upon determining that the UE is expected to experience the similar interference environment, else instructing the UE to perform the second LBT procedure or to use the second set of LBT parameters upon determining that the UE is expected to experience the different interference environment.

8. The method of claim 6, further comprising determining that the UE is expected to experience the different interference environment upon determining that one or more scheduled UEs do not perform UL transmissions at a predetermined time.

9. The method of claim 6, further comprising maintaining a one-bit value indicating whether the UE and the at least one other UEs successfully completed a last scheduled UL transmission, and determining whether the UE is expected to operate in the similar or different interference environment based on the one-bit value.

10. The method of claim 6, further comprising maintaining a percentage value indicating how often the UE or any of the at least one other UEs successfully completed a previous scheduled UL transmission, and determining whether the UE is expected to operate in the similar or different interference environment based on the percentage value.

11. A method of operating a user equipment (UE), comprising:
    receiving instructions to perform a first or second listen-before-talk (LBT) procedure or to use a first or second set of LBT parameters; and
    performing the first or second listen-before-talk (LBT) procedure or using the first or second set of LBT parameters, according to the received instructions,
    wherein the second LBT procedure or second set of LBT parameters differs from the first LBT procedure or first set of LBT parameters in that additional LBT opportunities are provided during a scheduled duration, and wherein the scheduled duration comprises multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

12. The method of claim 11, wherein the instructions are transmitted on an uplink (UL) scheduling control channel.

13. The method of claim 11, wherein the instructions to perform a first or second listen-before-talk (LBT) procedure or to use a first or second set of LBT parameters are determined according to an operating environment of the UE, and wherein the operating environment is determined based on statistics of UL transmissions for scheduled UEs.

14. The method of claim 11, wherein the instructions to perform a first or second listen-before-talk (LBT) procedure or to use a first or second set of LBT parameters are determined according to an operating environment of the UE, and wherein the operating environment is determined based on an operating environment indication provided by the UE to a radio access node based on the UE's own channel measurement.

15. The method of claim 14, wherein the instructions to perform a first or second listen-before-talk (LBT) procedure or to use a first or second set of LBT parameters are determined according to an operating environment of the UE, and wherein the operating environment indication indicates whether the UE observes persistent short interference bursts rather than long interference bursts.

16. The method of claim 11, wherein the instructions to perform a first or second listen-before-talk (LBT) procedure or to use a first or second set of LBT parameters are determined according to an operating environment of the UE, and wherein the operating environment of the UE is determined according to whether the UE is expected to experience a similar or different interference environment compared to at least one other UE to be scheduled in different frequency sub-carriers on the same cell as the UE.

17. The method of claim 16, further comprising receiving an instruction to perform the first LBT procedure or to use the first set of LBT parameters when the UE is expected to experience the similar interference environment, else receiving an instruction to perform the second LBT procedure or to use the second set of LBT parameters when the UE is expected to experience the different interference environment.

18. A radio access node configured to control a user equipment (UE), comprising:
at least one memory, transceiver, and processor collectively configured to:
selectively instruct the UE to perform a first or second listen-before-talk (LBT) procedure or to use a first or second set of LBT parameters, wherein the second LBT procedure or second set of LBT parameters differs from the first LBT procedure or first set of LBT parameters in that additional LBT opportunities are provided during a scheduled duration, and wherein the scheduled duration comprises multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

19. The radio access node of claim 18, wherein instructing the UE comprises transmitting information on an uplink scheduling control channel.

20. The radio access node of claim 18, wherein the at least one memory, transceiver, and processor are further collectively configured to determine an operating environment of the UE and perform the selectively instructing according to the determined operating environment, wherein the operating environment is determined based on statistics of uplink transmissions for scheduled UEs.

21. The radio access node of claim 18, wherein the at least one memory, transceiver, and processor are further collectively configured to determine an operating environment of the UE and perform the selectively instructing according to the determined operating environment, wherein the operating environment is determined based on an operating environment indication provided from the UE based on the UE's own channel measurement.

22. The radio access node of claim 21, wherein the at least one memory, transceiver, and processor are further collectively configured to determine an operating environment of the UE and perform the selectively instructing according to the determined operating environment, wherein the operating environment indication indicates whether the UE observes persistent short interference bursts rather than long interference bursts.

23. The radio access node of claim 18, wherein the at least one memory, transceiver, and processor are further collectively configured to determine an operating environment of the UE and perform the selectively instructing according to the determined operating environment, wherein determining the operating environment of the UE comprises determining whether the UE is expected to experience a similar or different interference environment compared to at least one other UE to be scheduled in different frequency sub-carriers on the same cell as the UE.

24. The radio access node of claim 23, wherein the at least one memory, transceiver and processor are further collectively configured to instruct the UE to perform the first LBT procedure or to use the first set of LBT parameters upon determining that the UE is expected to experience the similar interference environment, else instructing the UE to perform the second LBT procedure or to use the second set of LBT parameters upon determining that the UE is expected to experience the different interference environment.

25. The radio access node of claim 23, wherein the at least one memory, transceiver and processor are collectively further configured to determine that the UE is expected to experience the different interference environment upon determining that one or more scheduled UEs do not perform UL transmissions at a predetermined time.

26. The radio access node of claim 23, wherein the at least one memory, transceiver and processor are further collectively configured to maintain a one-bit value indicating whether the UE and the at least one other UEs successfully completed a last scheduled UL transmission, and determine whether the UE is expected to operate in the similar or different interference environment based on the one-bit value.

27. The radio access node of claim 23, wherein the at least one memory, transceiver and processor are collectively further configured to maintain a percentage value indicating how often the UE or any of the at least one other UEs successfully completed a previous scheduled UL transmission, and determine whether the UE is expected to operate in the similar or different interference environment based on the percentage value.

28. A user equipment (UE), comprising:
a memory, transceiver, and at least one processor collectively configured to:
receive instructions to perform a first or second listen-before-talk (LBT) procedure or to use a first or second set of LBT parameters; and
perform the first or second listen-before-talk (LBT) procedure or use the first or second set of LBT parameters, according to the received instructions,
wherein the second LBT procedure or second set of LBT parameters differs from the first LBT procedure or first set of LBT parameters in that additional LBT opportunities are provided during a scheduled duration, and wherein the scheduled duration comprises multiple subframes, wherein the second LBT procedure or second set of LBT parameters provides at least one LBT opportunity in each subframe of the scheduled duration, and wherein the first LBT procedure or first set of LBT parameters does not provide at least one LBT opportunity in each subframe of the scheduled duration.

29. The UE of claim 28, wherein the instructions are transmitted on an uplink (UL) scheduling control channel.

30. The UE of claim 28, wherein the instructions to perform a first or second listen-before-talk (LBT) procedure or to use a first or second set of LBT parameters are determined according to an operating environment of the UE, and wherein the operating environment is determined based on statistics of UL transmissions for scheduled UEs.

31. The UE of claim 28, wherein the instructions to perform a first or second listen-before-talk (LBT) procedure or to use a first or second set of LBT parameters are determined according to an operating environment of the UE, and wherein the operating environment is determined based on an operating environment indication provided by the UE to a radio access node based on the UE's own channel measurement.

32. The UE of claim 31, wherein the instructions to perform a first or second listen-before-talk (LBT) procedure or to use a first or second set of LBT parameters are determined according to an operating environment of the UE, and wherein the operating environment indication indicates whether the UE observes persistent short interference bursts rather than long interference bursts.

33. The UE of claim 28, wherein the instructions to perform a first or second listen-before-talk (LBT) procedure or to use a first or second set of LBT parameters are determined according to an operating environment of the UE, and wherein the operating environment of the UE is determined according to whether the UE is expected to experience a similar or different interference environment compared to at least one other UE to be scheduled in different frequency sub-carriers on the same cell as the UE.

34. The UE of claim 33, further comprising receiving an instruction to perform the first LBT procedure or to use the first set of LBT parameters when the UE is expected to experience the similar interference environment, else receiving an instruction to perform the second LBT procedure or to use the second set of LBT parameters when the UE is expected to experience the different interference environment.

35. A method of operating a network node in a wireless communication system, comprising:
determining a load of the wireless communication system;
determining a listen before talk (LBT) procedure or LBT parameters for a plurality of user equipment (UE) devices based on the determined load; and
instructing the UE devices to perform the determined LBT procedure or to use the determined LBT parameters;
wherein determining the LBT procedure or LBT parameters comprises:
scheduling the UE devices based on the determined load;
determining whether any of the scheduled UE devices are concurrently scheduled in a subframe or in one or more consecutive subframes; and
determining the LBT procedure or LBT parameters according to the determination of whether the scheduled UE devices are concurrently scheduled in the subframe or in one or more consecutive subframes.

* * * * *